(12) United States Patent
Lin

(10) Patent No.: US 7,661,353 B2
(45) Date of Patent: Feb. 16, 2010

(54) HOT BEVERAGE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 554 days.

(21) Appl. No.: 11/550,319

(22) Filed: Oct. 17, 2006

(65) Prior Publication Data

US 2008/0087171 A1    Apr. 17, 2008

(51) Int. Cl.
*A47J 31/00* (2006.01)
*A47J 31/30* (2006.01)

(52) U.S. Cl. .......................... 99/299; 99/303; 99/323.3

(58) Field of Classification Search ................... 99/299, 99/304, 303, 302 R, 287, 323, 323.3
See application file for complete search history.

(56) References Cited

U.S. PATENT DOCUMENTS 3,344,732 A * 10/1967 von Kleydorff et al. ....... 99/292
6,817,280 B2 * 11/2004 Hall et al. ..................... 99/292
6,968,775 B2 * 11/2005 Burrows et al. ............... 99/303
7,047,869 B2 *  5/2006 Leung et al. .................. 99/304

* cited by examiner

*Primary Examiner*—Reginald L. Alexander
(74) *Attorney, Agent, or Firm*—Alan Kamrath; Kamrath & Associates PA

(57) ABSTRACT

A hot beverage maker has an infusion device including a water container having a base and a lid and a filtration tank in the water container. The filtration tank includes a stopper on a bottom, an overflow outlet on a side wall, a filtration mesh having a hot-water duct of silicone rubber, and a lid pivotally connected to a top. When the hot beverage maker is activated to heat, cold water in the water container flows into heating tubes of a heating device via a first connective tube to be heated. Then, hot water flows upwards via a second connective tube into the filtration tank from the bottom of the filtration tank. Thus, the coffee powder/tea leaves inside of the filtration mesh is/are sufficiently infused. The stopper can be pressed upwards to be opened so as to cause the sufficiently infused coffee/tea to drip.

9 Claims, 5 Drawing Sheets

HOT BEVERAGE MAKER

FIELD OF THE INVENTION

The invention relates to a hot beverage maker and, more particularly, to an infusion device for a hot beverage maker that utilizes high-temperature hot water and injects hot water from the bottom to infuse coffee powder/tea leaves by dripping, so that the coffee/tea becomes more flavorful after infusion.

DESCRIPTION OF PRIOR ART

As more and more people begin to appreciate coffee/tea, the taste of coffee/tea becomes more essential. Accordingly, the structure of hot beverage makers becomes important and plays a crucial role in determining the taste of the brewed coffee/tea. Infusion devices in hot beverage makers are especially important. Currently, hot beverage makers developed by the industry are diverse in formation and composition. Generally, hot beverage makers of various formations and compositions infuse the ground coffee beans (or tea leaves) by dripping with the use of infusion devices.

Generally speaking, a small coffee brewer or hot beverage maker used at home disclosed in the prior art is equipped with a water container disposed at one side of a main body. Cold water in the water container is allowed to flow through a heating device inside of the main body in order to be heated and becomes high-temperature hot water. The hot water then flows upwards through a connective tube linked to a water outlet of a heating tube and into a water inlet formed at the topmost position of a filtration tank. Subsequently, the coffee powder/tea leaves within the filtration tank is infused and finally allowed to drip into a pot via a beverage outlet. However, in hot beverage makers that infuse and brew coffee/tea by allowing hot water to drip downwards from the top, the hot water temperature is easily reduced, because the time it takes the hot water to drip and come into contact with the coffee powder/tea leaves is long. This in turn contributes to the loss of flavor in the brewed coffee (or tea).

SUMMARY OF THE INVENTION

Therefore, in response to the above-mentioned problem of less flavorful coffee/tea brewed by using the conventional method that hot water is sprayed from the top for infusing coffee/tea and with much ingenuity and experimentation, the present invention develops an inverse method that hot water is sprayed from the bottom. This method can effectively reduce the time required for hot water to drip into the coffee powder/tea-leaves, thereby achieving a design that can brew more flavorful coffee.

The main objective of the invention is to provide a hot beverage maker including an infusion device disposed on an upper portion of a main body of the hot beverage maker. The infusion device comprises a water container having a base and a lid and a filtration tank in the water container. The filtration tank includes a stopper on a bottom, an overflow outlet on a side wall, a filtration mesh having a hot-water duct of silicone rubber, and a lid pivotally connected to a top. When the hot beverage maker is activated to heat, cold water in the water container flows out of a water-out opening and into heating tubes of a heating device via a first connective tube to be heated to become high-temperature hot water. Then, hot water flows upwards via a second connective tube linked to outlets of the heating tubes and into the filtration tank from the bottom of the filtration tank, thus the coffee powder/tea leaves inside of the filtration mesh is/are sufficiently infused, The stopper can be pressed upwards to be opened by a lid of a glass pot so as to cause the sufficiently infused coffee/tea to drip into the glass pot.

BRIEF DESCRIPTION OF DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

Figure 1:
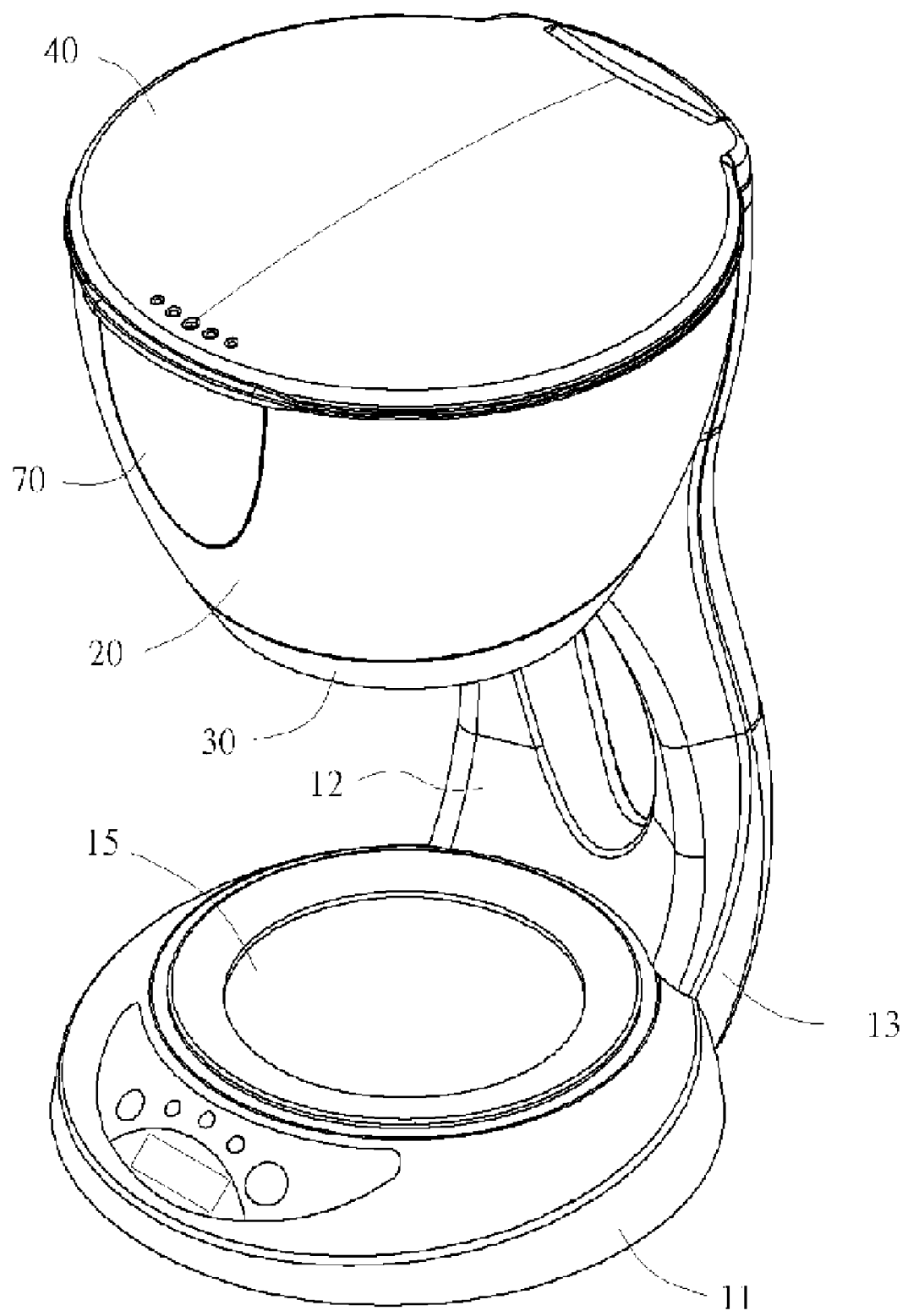
FIG. 1 is a perspective view of a hot beverage maker according to the invention.
Figure 2:
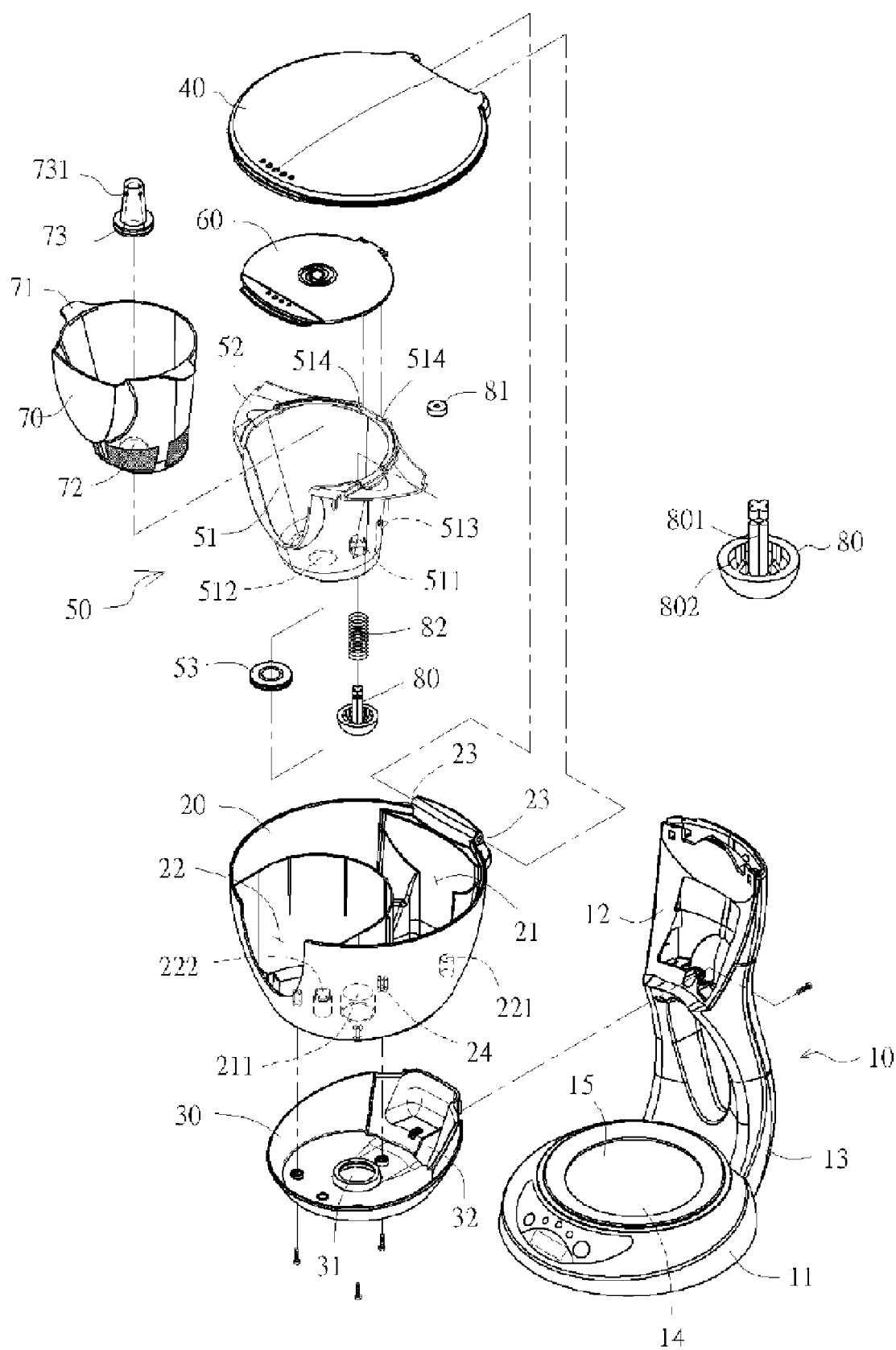
FIG. 2 is an exploded perspective view showing the hot beverage maker of the invention.

As shown in FIGS. 1 and 2, a hot beverage maker of this invention is comprised of an infusion device disposed on an upper portion of a main body 10. Said infusion device comprises a water container 20, a water container base 30, a water container lid 40, a filtration tank 50, a filtration tank lid 60, and a filtration mesh 70.

The main body 10 consists of a lower part 11, a frontal part 12, a rear part 13, a heating device consisting of heating tubes 14, an insulating plate 15, connective tubes 16, 17, control units (not shown), and print circuit board (PCB) components (not shown).

The internal space of said water container 20 is separated into a water storage area 21 and a supporting area 22. A water-out opening 211 is formed on a bottom of said water storage area 21 and a through opening 221 is formed on the supporting area 22. A protruding pole 222 with a through hole is formed on a frontal side in relation to the through opening 221. Aligning openings 23 are formed at one side of a top edge of the water container 20 for pivotally connecting to the water container lid 40, and a plurality of aligning poles 24 project from the bottom surface of the water container 20 for being secured with the water container base 30 which has a through hole 31 and a notch 32.

The internal space of the filtration tank 50 is formed with a supporting area 51 for holding said filtration mesh 70 with tugs 71. Lugs 71 of the filtration mesh 70 are secured on lugs 52 extending from two opposing top edges of said filtration tank 50. A dripping opening 511 and a through opening 512 are formed on a bottom surface of the filtration tank 50 corresponding to the though opening 221 and the protruding pole 222 of the water container 20. A silicone rubber member 53 is embedded into the through opening 512. The dripping opening 511 is fitted with a stopper 80 having a silicone rubber member 81 for stopping water and an elastic element 82. A side wall of the filtration tank 50 is formed with an overflow outlet 513. A connective section 514 extends from one side of the filtration tank 50 for pivotally connecting the filtration tank lid 60 and allowing it to function. The through opening 72 of the filtration mesh 70 is filled with a hot-water duct 73 made of silicone rubber. The hot-water duct 73 is hollow inside and has a plurality of through openings 731 formed on a top end.

The stopper 80 is shaped as a reversed mushroom and has a plurality of grooves 801 formed on its shaft and a plurality of troughs 802 formed on its cap.

Figure 3:
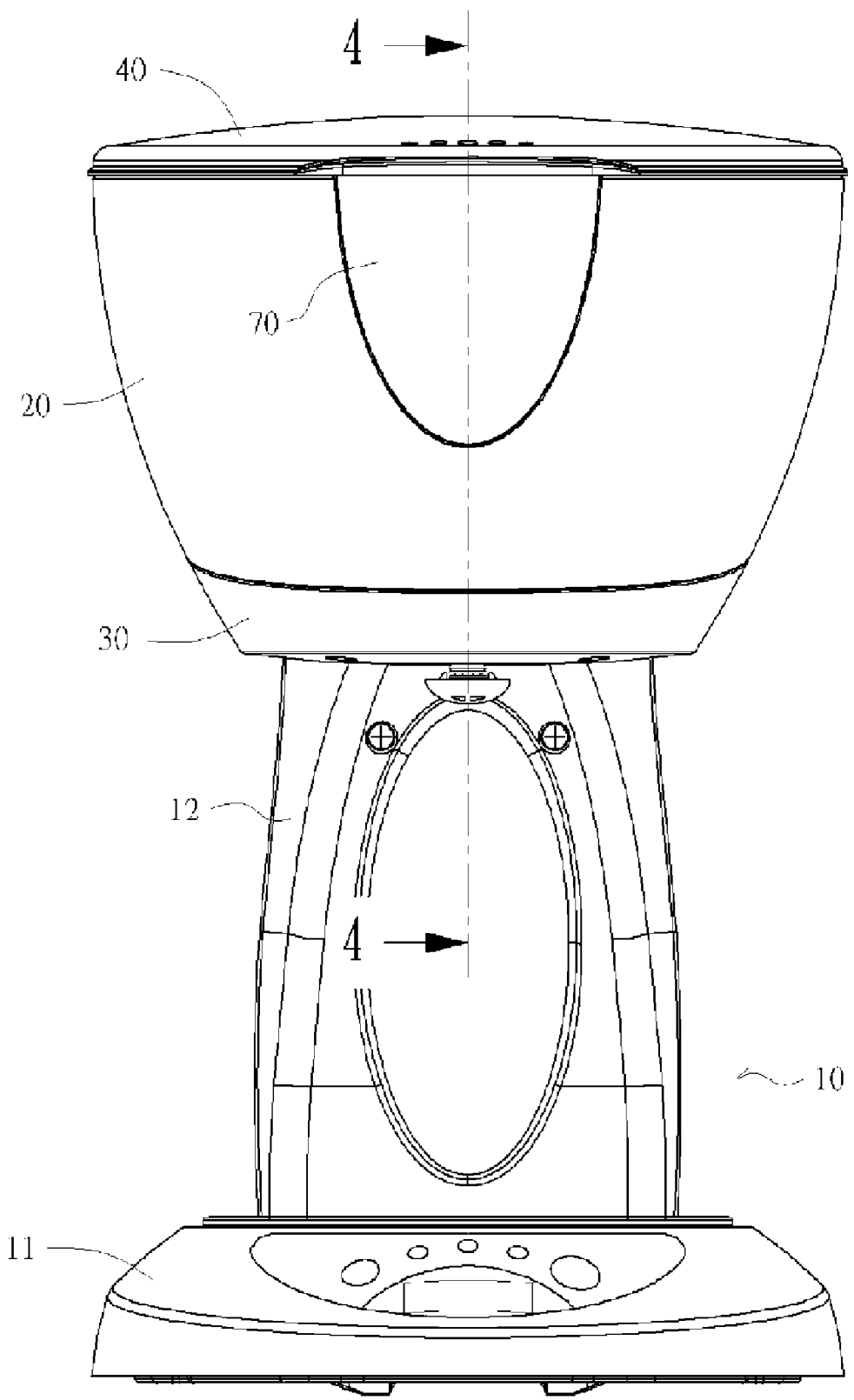
FIG. 3 is a front view showing the assembled hot beverage maker of the invention.
Figure 4:
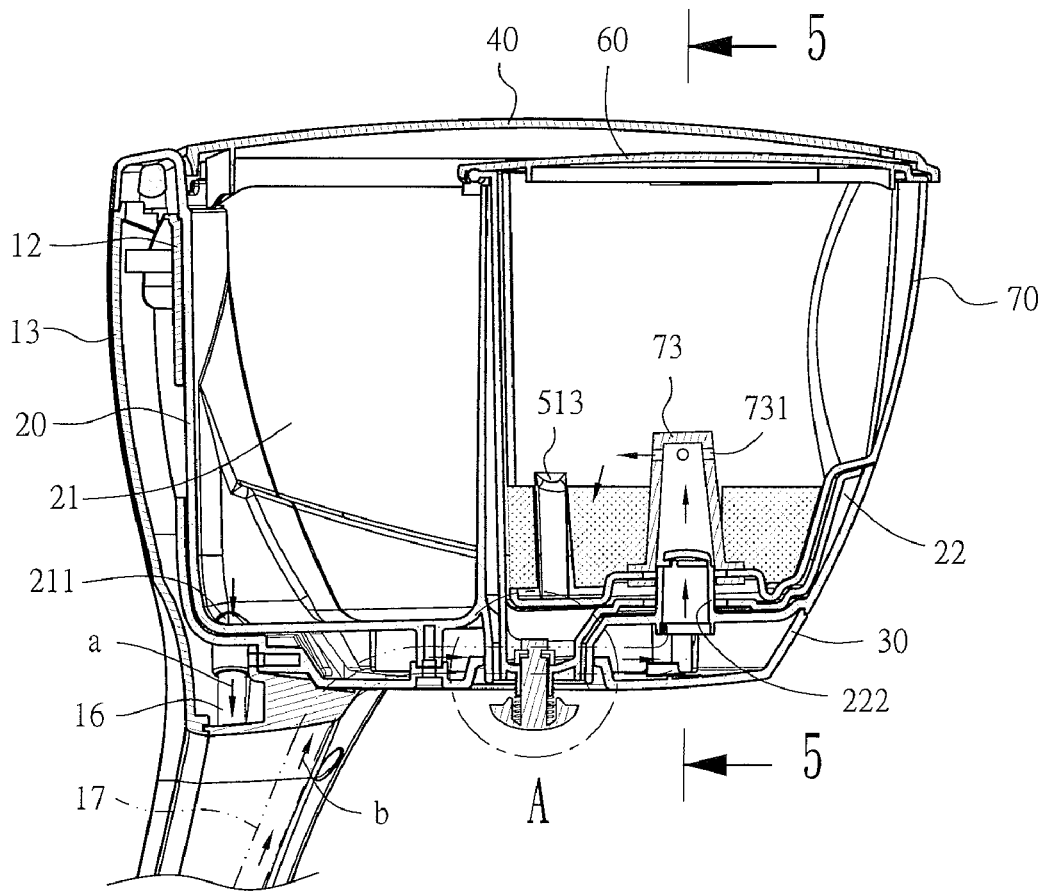
FIG. 4 is a cross-sectional view taken along line 4-4 of FIG. 3.
Figures 4A, 4B:
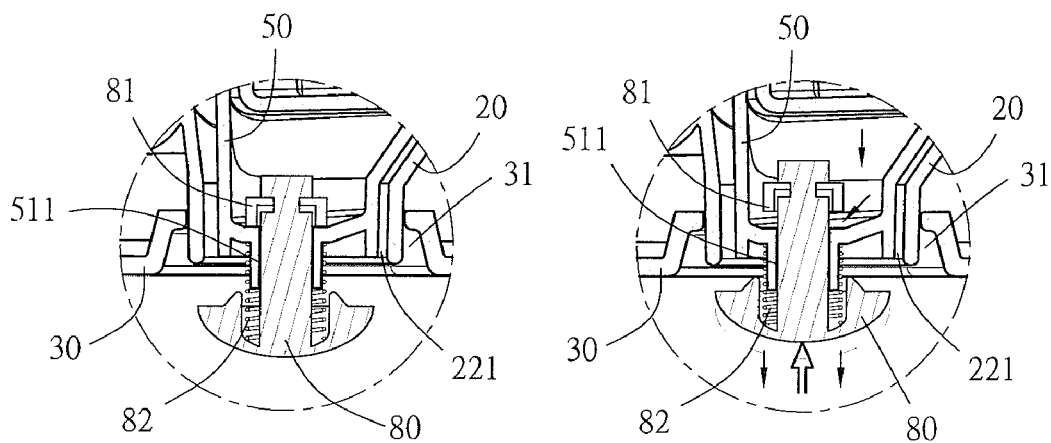
FIG. 4A is an enlarged view of encircled area A of FIG. 4.
FIG. 4B is a similar view of FIG. 4A being pressed upward.
Figure 5:
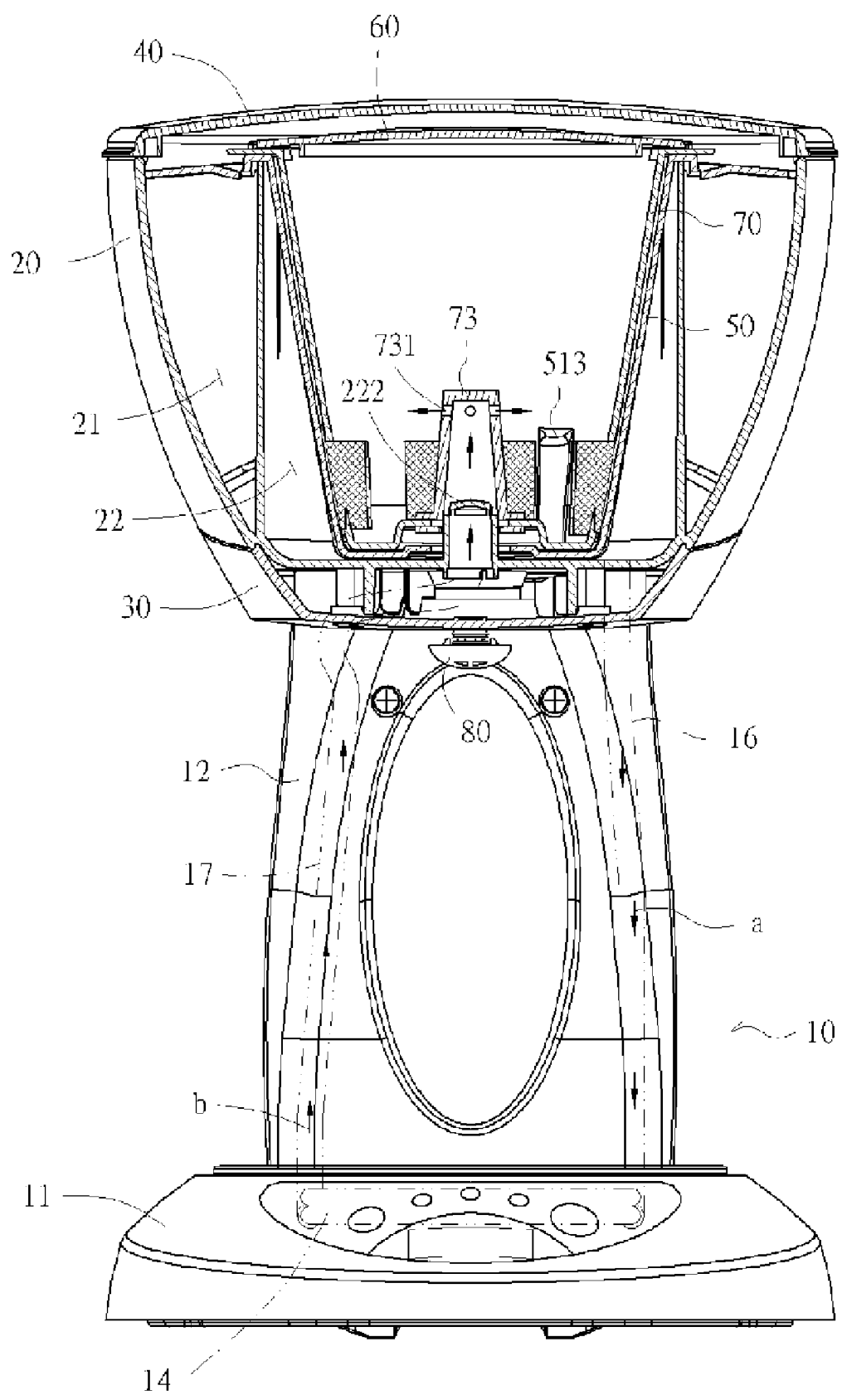
FIG. 5 is a cross-sectional view taken along line 5-5 of FIG. 4.

In the preferred embodiments, referring to FIGS. 3, 4, and 5, when using the hot beverage maker to brew coffee/tea, the water container lid 40 is opened first, and cold water (a) is poured into the water storage area 21 of the water container 20. Subsequently, the filtration tank lid 60 is opened, and the coffee powder/tea leaves is/are put on the filtration mesh 70.

When the hot beverage maker is activated to heat, the cold water (a) in the water container 20 flows out of the water-out opening 211 and into the heating tubes 14 to be heated to become high-temperature hot water (b) via the connective tube 16. Then the hot water (b) flows upwards into the filtration tank 50 located in the supporting area 22 of the water container 20 via the connective tube 17 linked to water outlets of the heating tubes 14. Subsequently, the hot water (b) is injected into the hot-water duct 73 inside the filtration mesh 70 from the bottom of the filtration tank 50 and then flows out its through opening 731. Hereby, the coffee powder/tea leaves inside of the filtration mesh 70 is/are sufficiently infused. The method that hot water is sprayed from the bottom as described above effectively reduces the time it takes for high-temperature hot water to drip into the coffee powder/tea leaves, and thus allowing brewed coffee/tea to be more flavorful than that brewed by conventional hot beverage makers. The stopper 80 is then pressed upward by a lid of a glass pot to be opened, which consequently causes the sufficiently infused coffee/tea to drip into the pot along the grooves 801 and the troughs 802 of the stopper 80.

In this invention, when the mesh member located below the filtration mesh 70 or the stopper 80 becomes clogged, the infused coffee would be accumulated within the filtration mesh 70 and allowed to escape through the overflow outlet 513 when the accumulated coffee is level with the overflow outlet 513. This serves as a precautionary safety measure.

What is claimed is:

1. A high-pressure steam hot beverage maker comprising:
   a heating device;
   an infusion device comprising a water container, wherein an inside space of the water container is separated into a water storage area for receiving cold water injected therein and a supporting area for holding a filtration tank, with the infusion device further including a water-out opening and a protruding pole with a through hole respectively formed adjacent to the water storage area and the supporting area of the water container;
   a through hole at a bottom of the filtration tank; and
   supporting area inside said filtration tank provided with a filtration mesh having a hot-water duct;
   wherein when activated to heat, cold water in the water container flows out of the water-out opening and into heating tubes of the heating device via a first connective tube to be heated to become high-temperature hot water, the hot water then flows upwards into the filtration tank located in the supporting area of the water container via a second connective tube linked to water outlets of the heating tubes, and subsequently, said hot water is injected into the hot-water duct of the filtration mesh from the bottom of the filtration tank and then flows out of through openings of the hot-water duct thus infusing coffee powder/tea leaves inside the filtration mesh; wherein such infusion effectively reduces the time for high-temperature hot water to drip into the coffee powder/tea leaves, wherein the bottom of said filtration tank has a dripping opening which has a stopper having a water-stopping member and an elastic element disposed therein and wherein a bottom of the supporting area of said water container has a through opening for allowing said stopper to be exposed.

2. The hot beverage maker of claim 1, with the water container having a base and a lid; wherein the hot beverage member further comprises:
   a silicon rubber member embedded into the through hole at the bottom of the filtration tank; and
   a connective section extending from the filtration tank and pivotally connected with a filtration tank lid, with the hot-water duct made of silicone rubber
   with the water-stopping member made of silicone rubber.

3. The hot beverage maker of claim 2, wherein said stopper is shaped as a reversed mushroom having a shaft formed with a plurality of grooves and a cap formed with a plurality of troughs.

4. The hot beverage maker of claim 3, wherein a side wall of said filtration tank is formed with an overflow outlet serving as a precautionary safeguard.

5. The hot beverage maker of claim 4 wherein the side wall extends from the supporting area of the filtration tank, with the side wall and the supporting area of the filtration tank defining an internal space, with the hot-water duct located in the internal space and spaced from the side wall.

6. The hot beverage maker of claim 2, wherein a side wall of said filtration tank is formed with an overflow outlet serving as a precautionary safeguard.

7. The hot beverage maker of claim 6 wherein the side wall extends from the supporting area of the filtration tank, with the side wall and the supporting area of the filtration tank defining an internal space, with the hot-water duct located in the internal space and spaced from the side wall.

8. The hot beverage maker of claim 3 wherein the filtration tank further includes a side wall extending from the supporting area of the filtration tank, with the sidewall and the supporting area of the filtration tank defining an internal space, with the hot-water duct located in the internal space and spaced from the side wall.

9. The hot beverage maker of claim 2 wherein the filtration tank further includes a side wall extending from the supporting area of the filtration tank, with the side wall and the supporting area of the filtration tank defining an internal space, with the hot-water duct located in the internal space and spaced from the side wall.

* * * * *